United States Patent
Sales Casals et al.

(10) Patent No.: US 9,559,463 B2
(45) Date of Patent: Jan. 31, 2017

(54) AUTOMATED TIGHTENER FOR A WET MATEABLE CONNECTION ASSEMBLY

(71) Applicant: PRYSMIAN S.P.A., Milan (IT)

(72) Inventors: Lluis Ramon Sales Casals, Milan (IT); Rafel Sitjar, Vilanova i la Geltru (ES); Monica Villegas, Vilanova i la Geltru (ES); Joan Solè Rovira, Vilanova i la Geltru (ES); Jaume Tort, Vilanova i la Geltru (ES); Erik Molino, Vilanova i la Geltru (ES)

(73) Assignee: PRYSMIAN S.P.A, Milan (IT)

( * ) Notice: Subject to any disclaimer, the term of this patent is extended or adjusted under 35 U.S.C. 154(b) by 0 days.

(21) Appl. No.: 14/779,290

(22) PCT Filed: Mar. 26, 2013

(86) PCT No.: PCT/IB2013/052401
§ 371 (c)(1),
(2) Date: Sep. 22, 2015

(87) PCT Pub. No.: WO2014/155150
PCT Pub. Date: Oct. 2, 2014

(65) Prior Publication Data
US 2016/0043504 A1    Feb. 11, 2016

(51) Int. Cl.
*H01R 33/965*    (2006.01)
*H01R 13/639*    (2006.01)
(Continued)

(52) U.S. Cl.
CPC ........... *H01R 13/639* (2013.01); *G02B 6/3816* (2013.01); *G02B 6/3887* (2013.01);
(Continued)

(58) Field of Classification Search
CPC ....... H02G 1/10; G02B 6/3893; G02B 6/3887; G02B 6/3816; H01R 43/26; H01R 43/16; H01R 13/523; H01R 13/639
(Continued)

(56) References Cited

U.S. PATENT DOCUMENTS

| | | | |
|---|---|---|---|
| 4,085,993 A * | 4/1978 | Cairns | H01R 13/523 439/201 |
| 5,363,789 A * | 11/1994 | Laurie | B63B 21/508 114/293 |

(Continued)

FOREIGN PATENT DOCUMENTS

| | | |
|---|---|---|
| CN | 101 260 951 | 9/2008 |
| CN | 101 303 094 | 11/2008 |
| FR | 2 500 573 | 8/1982 |

OTHER PUBLICATIONS

International Search Report from the European Patent Office for International Application No. PCT/IB2013/052401, mailing date Dec. 10, 2013.
(Continued)

*Primary Examiner* — Abdullah Riyami
*Assistant Examiner* — Nelson R Burgos-Guntin
(74) *Attorney, Agent, or Firm* — Finnegan, Henderson, Farabow, Garrett & Dunner, L.L.P.

(57) ABSTRACT

Automated tightener for a wet mateable connection assembly includes a first and a second watertight case, the automated tightener bearing a fixing assembly and including a first and a second sliding portion arranged in a parallel lay, connected together by a push/pull actuator substantially orthogonal thereto, each sliding portion being provided with operable engagers.

19 Claims, 10 Drawing Sheets

(51) Int. Cl.
  G02B 6/38 (2006.01)
  H01R 13/523 (2006.01)
  H01R 43/26 (2006.01)
  H01R 43/16 (2006.01)
  H02G 1/10 (2006.01)
(52) U.S. Cl.
  CPC ........... H01R 13/523 (2013.01); H01R 43/16 (2013.01); H01R 43/26 (2013.01); *G02B 6/3893* (2013.01); *H02G 1/10* (2013.01)
(58) Field of Classification Search
  USPC .................. 439/345, 310, 136, 142, 259
  See application file for complete search history.

(56) References Cited

U.S. PATENT DOCUMENTS

| | | | | |
|---|---|---|---|---|
| 5,462,098 | A * | 10/1995 | Murakami | E04G 21/122 140/119 |
| 6,315,461 | B1 * | 11/2001 | Cairns | G02B 6/3816 385/139 |
| 7,530,744 | B2 * | 5/2009 | Prel | G02B 6/3816 385/111 |
| 7,618,198 | B2 * | 11/2009 | Baxter | G02B 6/3816 385/53 |
| 7,628,637 | B2 * | 12/2009 | Kramer | H01R 13/639 439/353 |
| 8,388,235 | B1 * | 3/2013 | Volker | G02B 6/3816 385/52 |
| 8,827,570 | B2 * | 9/2014 | Lagathu | G02B 6/3816 385/52 |
| 8,955,425 | B2 * | 2/2015 | Sobolewski | 92/120 |
| 9,077,099 | B1 * | 7/2015 | Hatcher | G02B 6/3816 |
| 9,080,425 | B2 * | 7/2015 | Zediker | B63G 8/001 |
| 9,157,561 | B2 * | 10/2015 | Martin | F16L 37/35 |
| 9,163,648 | B2 * | 10/2015 | Kim | F01C 9/002 |
| 9,172,175 | B2 * | 10/2015 | Spencer | H01R 13/58 |
| 9,234,535 | B2 * | 1/2016 | Kim | F15B 15/06 |
| 9,260,024 | B1 * | 2/2016 | Lau | B60L 11/1816 |
| 9,263,824 | B2 * | 2/2016 | Cairns | H01R 13/523 |
| 9,270,051 | B1 * | 2/2016 | Christiansen | H01R 13/523 |
| 2001/0034153 | A1 * | 10/2001 | McIntosh | E21B 33/038 439/364 |
| 2003/0044236 | A1 * | 3/2003 | Toth | H02G 15/14 405/158 |
| 2004/0127084 | A1 * | 7/2004 | Glennie | F16L 37/252 439/316 |
| 2005/0070150 | A1 * | 3/2005 | Williams | E21B 23/006 439/374 |
| 2006/0045428 | A1 * | 3/2006 | Theuerkorn | G02B 6/3831 385/53 |
| 2006/0079107 | A1 * | 4/2006 | Allensworth | F16L 1/10 439/271 |
| 2009/0042422 | A1 * | 2/2009 | Morgan | H01R 13/523 439/152 |
| 2009/0045146 | A1 * | 2/2009 | Stoesz | E21B 23/00 210/767 |
| 2010/0144181 | A1 * | 6/2010 | Karlsen | H01R 43/26 439/193 |
| 2011/0130024 | A1 * | 6/2011 | Cairns | H01R 13/523 439/271 |
| 2011/0177697 | A1 * | 7/2011 | Cairns | H01R 13/523 439/18 |
| 2011/0207340 | A1 * | 8/2011 | Cairns | H01R 35/04 439/18 |
| 2013/0106105 | A1 * | 5/2013 | Dehlsen | F03B 17/061 290/43 |
| 2014/0246232 | A1 * | 9/2014 | Wyatt | H02G 1/10 174/75 D |
| 2014/0270645 | A1 * | 9/2014 | Toth | G02B 6/3816 385/58 |
| 2015/0171566 | A1 * | 6/2015 | Chen | H01R 13/6581 439/607.01 |
| 2015/0280355 | A1 * | 10/2015 | Hatcher | H01R 13/523 385/75 |
| 2015/0318641 | A1 * | 11/2015 | Kitchen | H01R 13/641 439/352 |
| 2015/0378125 | A1 * | 12/2015 | Sales Casals | H01R 13/523 385/56 |
| 2016/0036160 | A1 * | 2/2016 | Sales Casals | G02B 6/3816 439/588 |
| 2016/0043504 | A1 * | 2/2016 | Sales Casals | G02B 6/3816 439/345 |
| 2016/0115936 | A1 * | 4/2016 | Knox | F03B 3/128 415/36 |

OTHER PUBLICATIONS

Notification of Transmittal of the International Search Report and the Written Opinion of the International Searching Authority from the European Patent Office for International Application No. PCT/IB2013/052401, mailing date Dec. 10, 2013.

* cited by examiner

AUTOMATED TIGHTENER FOR A WET MATEABLE CONNECTION ASSEMBLY

CROSS REFERENCE TO RELATED APPLICATION

This application is a national phase application based on PCT/IB2013/052401, filed Mar. 26, 2013, the content of which is incorporated herein by reference.

BACKGROUND OF THE INVENTION

1. Field of the Invention

The present invention relates to an automated tightener for a wet mateable connection assembly for electrical and/or optical cables.

In particular the present invention especially refers to an automated tightener for a wet mateable connection assembly for undersea application.

In particular, the present invention refers to a wet mateable connection assembly for medium and high voltage electrical cables. Typically, by medium voltage cables we mean cables suitable for more than 1 kV and up to about 30 KV, and for high voltage cables we mean cables suitable for operating above about 30 kV.

2. Description of the Related Art

In the field of oceanic/undersea energy generation the technologies used to generate energy are dominantly "wind mills", but wave, tidal and photovoltaic generators are also important.

The wind mills are generally arranged in arrays and built with bottom structures fixed on the seabed; inter array underwater cables are used to go from one wind mill to the next in the array.

In order to connect the wind mills or similar apparatus to an electric network, cables may be used, wherein the cable connections are "dry mate", i.e. the ends of the cables coming from the wind mills and of the cables of the electric network or of intermediate stations are connected together (i.e. are mated, or unmated, by means of appropriate connectors) in a dry environment, to avoid the presence of water at the connector interface, which may produce partial discharges and the consequent cable faults in the presence of electrical field.

Cable hubs and/or cable substations can be used for connecting two or more underwater cables of an electric network. In these cases, and especially in places where water depth exceeds 40 m, the dry mating is more cumbersome because it implies retrieving from underwater, for example to a ship, a sunken hub or substation having a significant weight.

The dry mating is often unpractical and generally economically disadvantageous.

In offshore windmills and other submarine applications, wet mateable connection assemblies are used.

A wet mateable connection assembly is configured to allow the cable connection directly undersea; it typically comprises a first and a second case mateable to each other in a watertight manner along a longitudinal connecting axis.

Once the alignment and coupling between cases has been obtained, the cases should be fixed one another to realize a watertight connection. A fixing system comprising, for example, bolts or clamps is provided and tightened.

The step of tightening the fixing system cannot be always performed manually. For instance, it is not possible for an operator to work for the due time below a certain sea depth or in certain environmental conditions.

SUMMARY OF THE INVENTION

The Applicant recognized the need for a remotely operated underwater vehicle (ROV) capable of performing the tightening of the coupling means, such as bolts, clamps or the like, of the cases of a wet mateable connection assembly. Such kind of tightening implies the use of a ROV including a fixing assembly capable of exerting a significant force, for example a torque or thrust force, as required to operate on the cases coupling means which are designed for fastening watertight case of a weight of 300 kg or more. For example, tightening bolts of a submarine case for wet mate connection may require a torque of the order of 400-500 N/m.

The Applicant solved the problem by a tightening system capable of fitting onto one of the cases of a wet mateable connection assembly and of moving on it for enabling its fixing assembly to act on each coupling means connecting the two mateable cases.

In particular, the Applicant perceived that a tightening system comprising a first and a second portions movably connected one another, could move on the body of one of the cases to be mated by keeping a first portion anchored to the case body, and advancing the second one on the case, then anchoring the second and allowing the first portion to disengage and reach the second one. This enables to move along the whole extension of the coupling means with a simple repeatable action and with precise steps of predetermined extension.

In one aspect, the present invention relates to automated tightener for a wet mateable connection assembly comprising a first and a second watertight case, the automated tightener bearing a fixing assembly and comprising a first and a second sliding portions arranged in a parallel lay, connected together by a push/pull actuator substantially orthogonal thereto, each sliding portion being provided with operable engagers.

In particular the automated tightener comprises a first and a second sliding portion selectively fixable to and movable with respect to the wet mateable connection assembly, so that when one sliding portion is fixed, the other one can be moved by the push/pull actuator and vice versa. The operable engagers provide for the securing the sliding portions, in particular to one of the watertight case.

Preferably, each sliding portion comprises two standing plates substantially orthogonal to the parallel lay of the sliding portion and spaced by a spacing plate. Advantageously, the push/pull actuator is connected to the spacing plates of the sliding portions.

Advantageously, the automated tightener comprises guides for leading the reciprocal movement of the two sliding portions. Preferably, the guides are fixed onto the standing plates of one of the sliding portions and engaged with retaining elements of the other one. The guides define the path of the movement of the automated tightener over the water tight case.

Preferably, in case of cylindrical water tight case, the guides are arc shaped.

Advantageously, each standing plate bears one guide, only.

The operable engagers are advantageously provided across the standing plates of each sliding portion.

Preferably, the engagers are placed in a lower position of the standing plates and are movable in opposite directions, substantially parallel to the spacing plates.

The operable engagers of a sliding portion are advantageously operated jointly by a single engaging actuator.

The fixing assembly of the automated tightener of the invention comprises a tool for accomplishing the connection between the two watertight cases of the wet mateable assembly. Preferably, the fixing assembly comprises a power screw-driver tool for connecting the watertight cases by bolts, or an actuator for connecting the watertight cases by snapping clamps.

Preferably the automated tightener is remotely operated.

Preferably, the automated tightener of the invention comprises one fixing assembly, only.

In another aspect, the present invention relates to a method for underwater fastening a first watertight case to a second watertight case of a wet mateable connection assembly by an automated tightener, wherein the first watertight case is provided with an array of spaced coupling means; and the automated tightener bears a fixing assembly and comprises a first and a second sliding portion; comprising the steps of:

associating the automated tightener with the first watertight case;

engaging the first sliding portion to the first watertight case;

locking a coupling means of the array to the second watertight case by operating the fixing assembly;

distancing the second sliding portion from the first sliding portion;

engaging the second sliding portion to the first watertight case;

disengaging the first sliding portion from the first watertight case;

approaching the first sliding portion to the second sliding portion;

repeating the steps up to completion of the tightening of the first to the second watertight case.

Preferably, the step of engaging the first and the second sliding portions to the first watertight case comprises engaging an operable engager of the automated tightener with a coupling portion of the first watertight case.

Preferably, the coupling portion of the first watertight case is a flange.

Preferably, the array of spaced coupling means is arranged on a flange of the first watertight case.

More preferably, the flange bearing the array of spaced coupling means is other than the flange forming the coupling portion.

Preferably, engaging the first sliding portion or the second sliding portion to the first watertight case comprises engaging two operable engagers with two axially spaced coupling portions arranged on the first watertight case.

Advantageously, the method for underwater fixedly tightening a first watertight case to a second watertight case of a wet mateable connection assembly further comprises removing the automated tightener from the wet mateable connection assembly after tightening completion.

Preferably, removing the automated tightener comprises connecting a scaffolding to the automated tightener, disengaging both the first sliding portion and the second sliding portion from the first watertight case and hauling the scaffolding together with the automated tightener connected thereto.

Preferably, associating the automated tightener with the first watertight case comprises firmly attaching the scaffolding to the first watertight case while keeping the first sliding portion and the second sliding portion disengaged from the first watertight case and keeping the automated tightener connected to the scaffolding, sinking the scaffolding and the first watertight case connected thereto.

Alternatively, in case the first watertight case is already sunken in proximity of the second watertight case, associating the automated tightener with the first watertight case comprises sinking the scaffolding and the automated tightener connected thereto and positioning the scaffolding over the first watertight case.

The method of the invention is applicable, mutatis mutandis, for disengaging the first from the second watertight case.

The scaffolding of the present invention advantageously comprises two ledgers and a porting flange protruding from substantially the middle of each ledger. The porting flanges bear a grasping actuator. Each end of the grasping actuator is connected with two hanging rods crossing the porting flanges and having heads designed for inserting in holes provided in the upper portion of each standing plate of the automated tightener.

Preferably, the scaffolding further comprises at least one arm bearing a bonding ring for engaging a conical portion of the cylindrical watertight case.

BRIEF DESCRIPTION OF THE DRAWINGS

The characteristics and advantages of the automated tightener and method according to the present invention will become more apparent from the following description, with reference to the attached schematic drawings wherein.

DETAILED DESCRIPTION OF THE INVENTION

Figure 1:
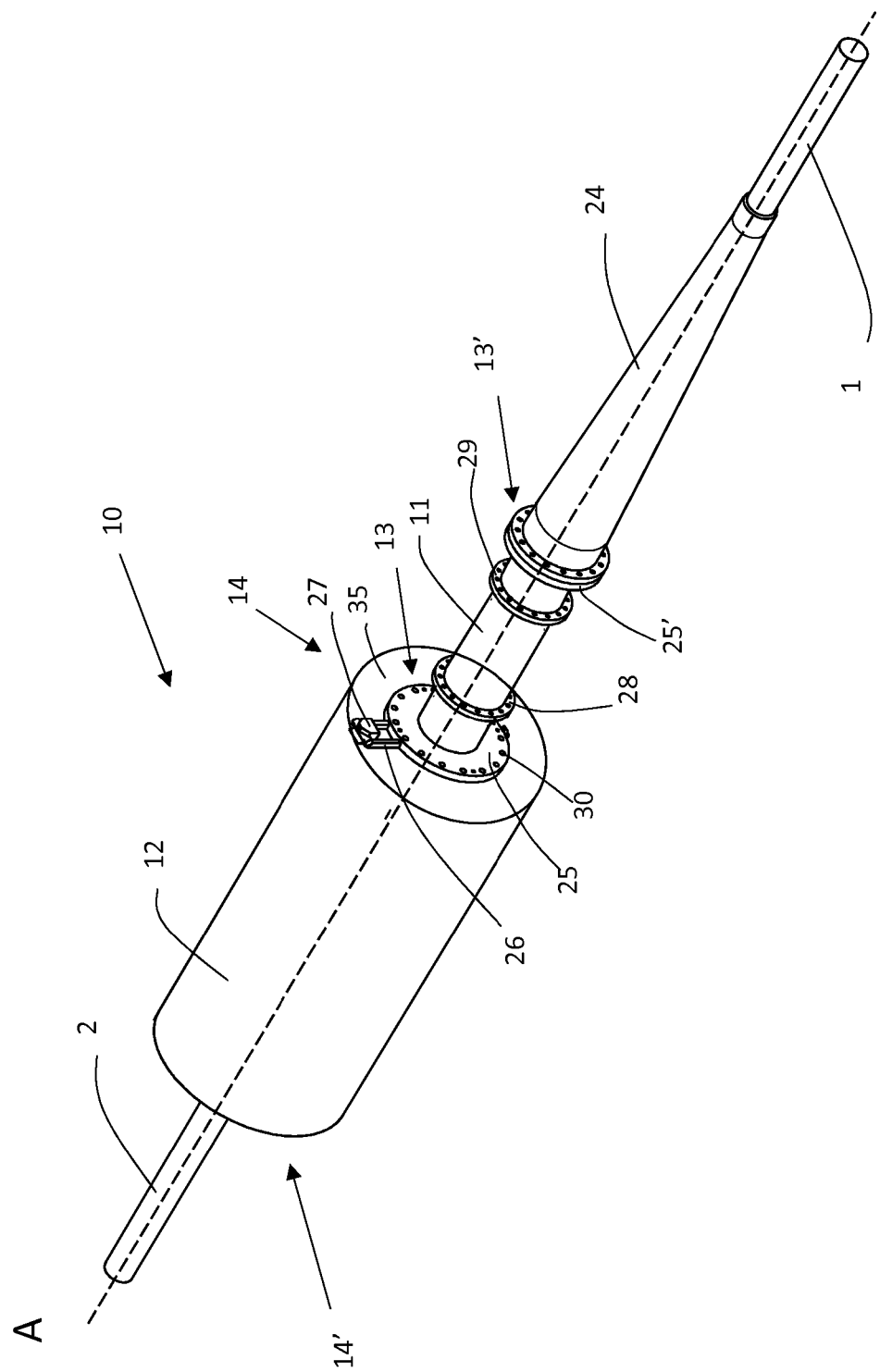
FIG. 1 is a perspective view of an example of wet mateable connection assembly.
Figure 2:
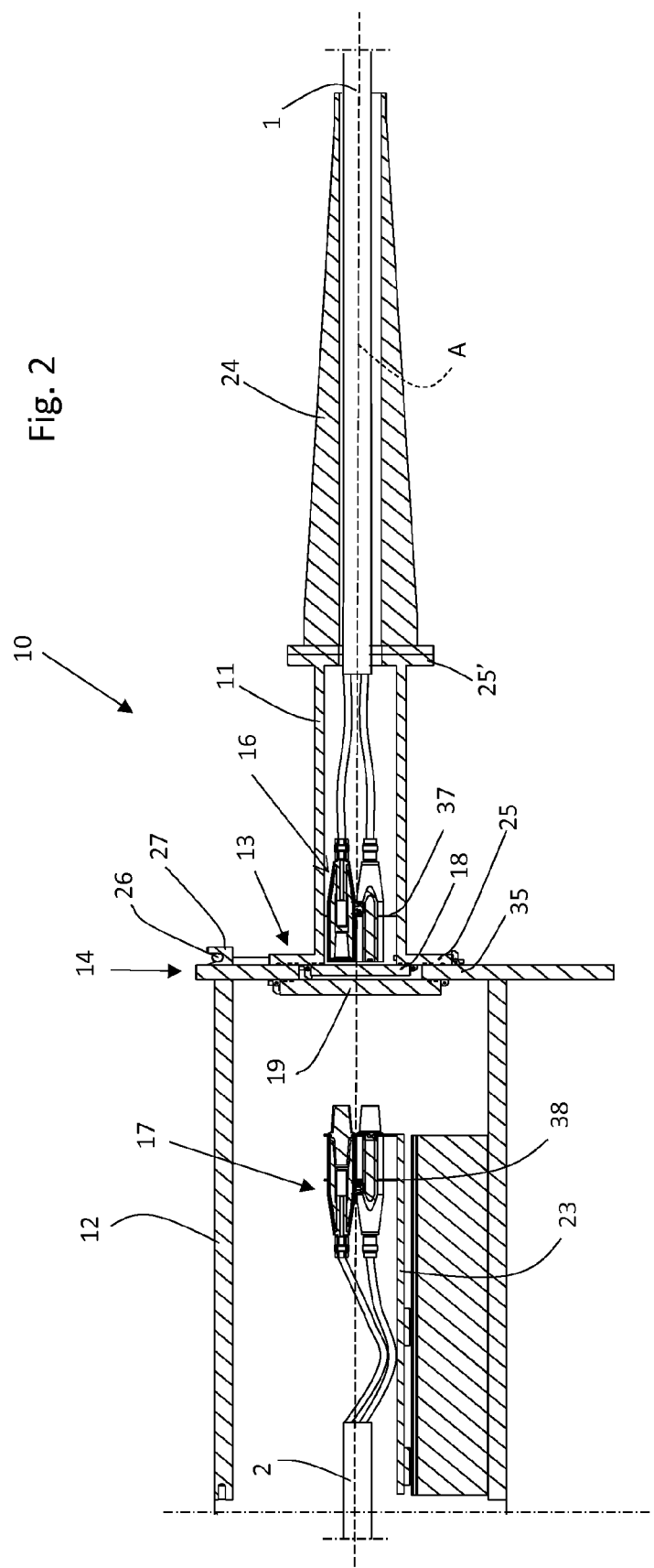
FIG. 2 is a sectional view of the wet mateable connection assembly of FIG. 1.
Figure 3:
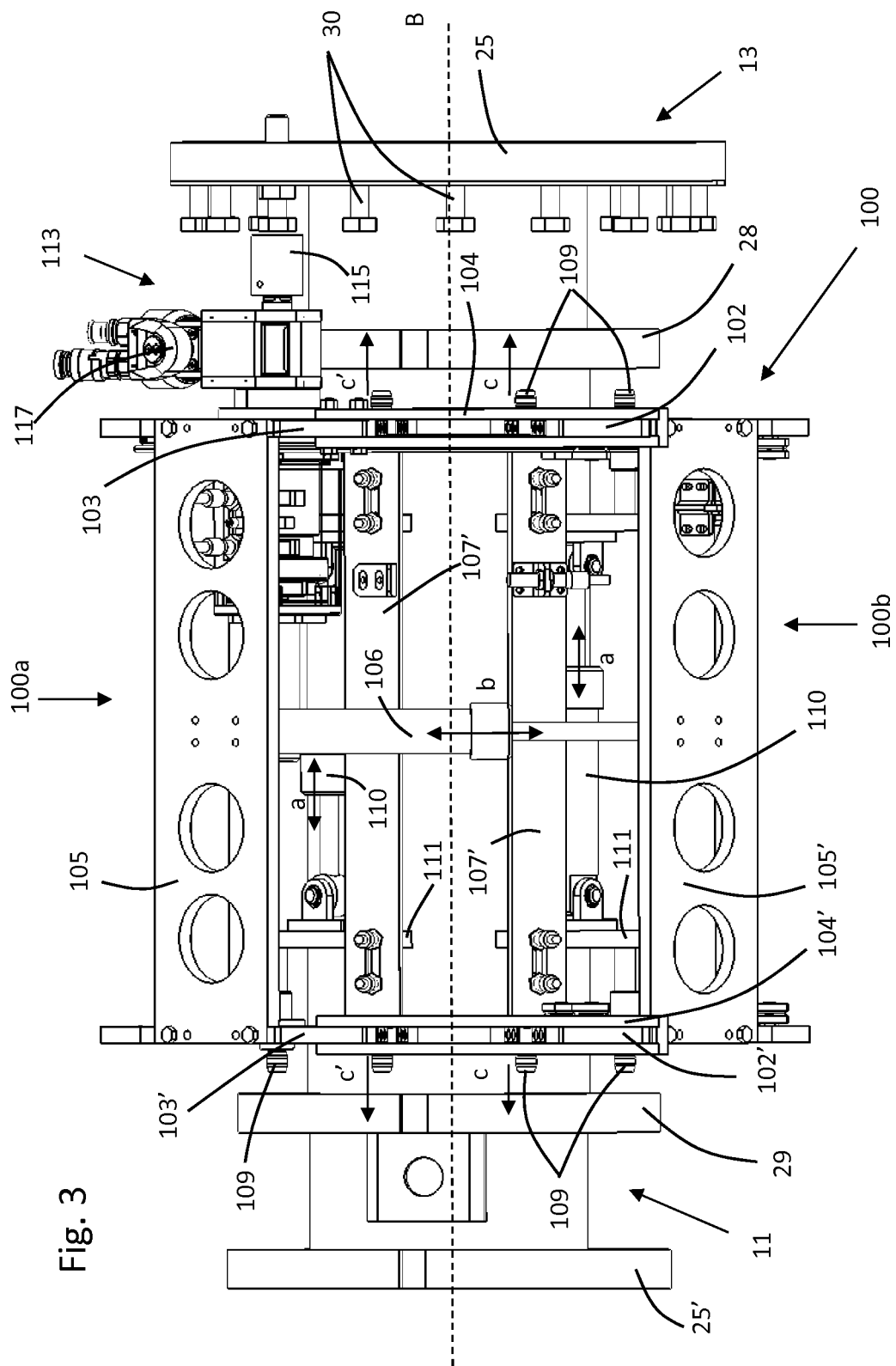
FIGS. 3-5 are views of an automated tightener according to an embodiment the present invention.

With reference to FIGS. 1-2, an embodiment of a wet-mateable connector is shown with 10.

With reference to FIG. 1, the wet mateable connection assembly 10 comprises a first watertight case 11 with a cable 1 exiting therefrom and a second watertight case 12 with a cable 2 exiting therefrom, cases 11 and 12 being mated to each other in a watertight manner along a common longitudinal connecting axis A.

Each case 11, 12 comprises a respective first and second connection end 13, 14 which are intended to be adjoined to each other when the two cases are mated together as shown in FIG. 1. The connection ends 13, 14 comprise respective substantially circular apertures perpendicular to the connecting axis A.

The first connection end 13 of the first case 11 has an annular flange 25 having an axial aperture. On annular flange 25, bolts 30 are provided to be mated with corresponding threaded holes provided on connecting surface 35 of the second case 12.

The connecting end 13 of the first case 11 comprises a guide handle 26 associable with a seat 27 provided on the connecting end 14 of the second case 12.

Figure 4:
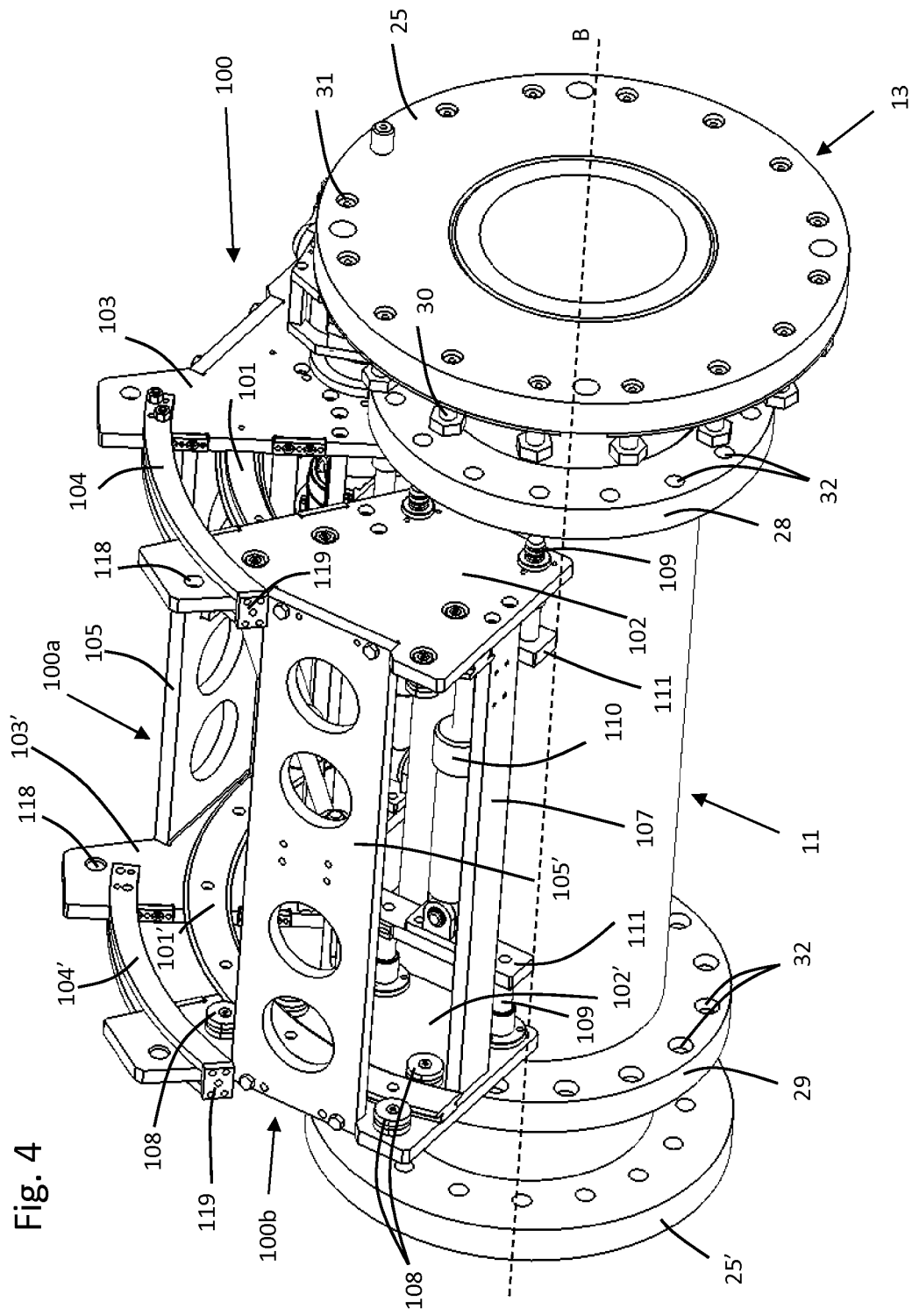

The first case 11 also comprises front and rear sub-flanges 28, 29, each comprising mating holes 32 (better detailed in FIG. 4, for example) into the surface thereof.

Each case 11, 12 comprises a respective first and end 13', 14' opposite to the first and second connection end 13, 14.

The first case 11 comprises a bend stiffener 24 fixed to the opposite end 13', providing a smooth connection between the rigid portable case 11 and the cable 1 connected thereinto. The opposite end 13' also comprises an annular flange 25' suitable, inter alia, for connecting the bend stiffener 24.

As shown in FIG. 2, the first case 11 has a first gate 18 of and the second case 12 has a second gate 19.

The opening of gates 18 and 19 is allowed only after fastening together the respective case 11 and 12. Said operation is performed with the automated tightener of the invention according to a procedure which shall be detailed later on.

The gates 18 and 19 are opened in a sequence suitable for maintaining the water-tightness of the assembly 10 and leaving the connecting interface substantially dry.

To this end, preferably gate 18 and/or gate 19 comprise a plurality of sealing rings.

The first case 11 houses first phase connectors 16, supported by a relevant cage 37 arranged inside the first case 11; the phase connectors 16 are coupled to corresponding cable phases of a three phases cable 1.

The second case 12 houses second phase connectors 17 supported by a relevant movable cage 38. The phase connectors 17 are coupled to respective cable phases of a three phase cable 2.

The portion of the three phase cable 2 water-tightly housed in the case 12 has a length—for example 1-1.5 m—suitable to enable the movement of the phase connectors 17 from a distal position to a connecting position.

The first phase connectors 16 are fixed with respect to the first case 11 to face the connection end 13 with a gap of, for example, 3 mm, while the second phase connectors 17 are mounted on a bearing structure 23.

The bearing structure 23—and, according, the second phase connectors 17—is movable from a distal position, where the second phase connectors 17 are spaced from the connection end 14, to a connecting position where the second phase connectors 17 extend through connection end 14 toward the first phase connectors 16 so as to connect thereto to establish the sought electrical and mechanical coupling.

The opening of gate 18, 19 and the moving of the second phase connectors 17 are remotely operated, for example by a low voltage power feed line and a communication line brought by a ROV or by the automated tightener itself.

The fixing and tightening together of the respective case 11 and 12 are performed with an automated tightener 100 as described in FIGS. 3-10. In FIGS. 3-5 and 9 the automated tightener 100 is associated to the first case 11.

The automated tightener 100 is automatically mobile step by step around the longitudinal axis B of the first case 11, in order to secure the bolts 30—pre-arranged into the annular flange 25 of connecting end 13—into the corresponding threaded holes 31 of the connecting surface 35 of the case 12, thus fixing the coupling between cases 11 and 12.

In particular the automated tightener 100 comprises a first and a second sliding portion 100a, 100b fixable to the front and rear sub-flanges 28, 29 of the first case 11 and movable around the longitudinal axis B of the case 11. In particular, during the fastening process, when one of the first and second sliding portions 100a, 100b is engaged, the other sliding portion 100a, 100b is unfixed and can slide upon the surface of the case 11. Further particulars will be provided in the following when describing the performance of the automated tightener 100.

As shown in the figures, each sliding portion 100a, 100b comprises two standing plates 102, 102', 103, 103' substantially orthogonal to parallel lay of the sliding portion 100a, 100b. Each couple of standing plate 102, 102' and 103, 103' is connected one another by a spacing plate 105, 105' arranged at the upper portion thereof, and by two elongated elements 107, 107' at a lower portion thereof.

Each sliding portion 100a, 100b comprises an engaging actuator 110 arranged between the respective first and second standing plates 103, 103' and 102, 102'. Each actuator 110 bears a couple of operable engagers 109 at each end thereof. The engagers 109 cross the lower portion of the standing plate 102, 102', 103, 103', two per plate, in parallel, horizontal position. Each couple of operable engagers 109 is connected to one end of an engaging actuator 110 via an arm 111 perpendicular to the engagers 109 and the actuator 110. The engaging actuator 110 (typically, a hydraulic cylinder) is movable from a non-working position to a working position (as indicated by double arrow a in FIG. 3) to translate the two couples of engagers 109 connected thereto into the mating holes 32 of the front and rear sub-flanges 28, 29, as indicated by arrows c, c' of FIG. 3, and vice versa in disengaging step.

Figure 6:
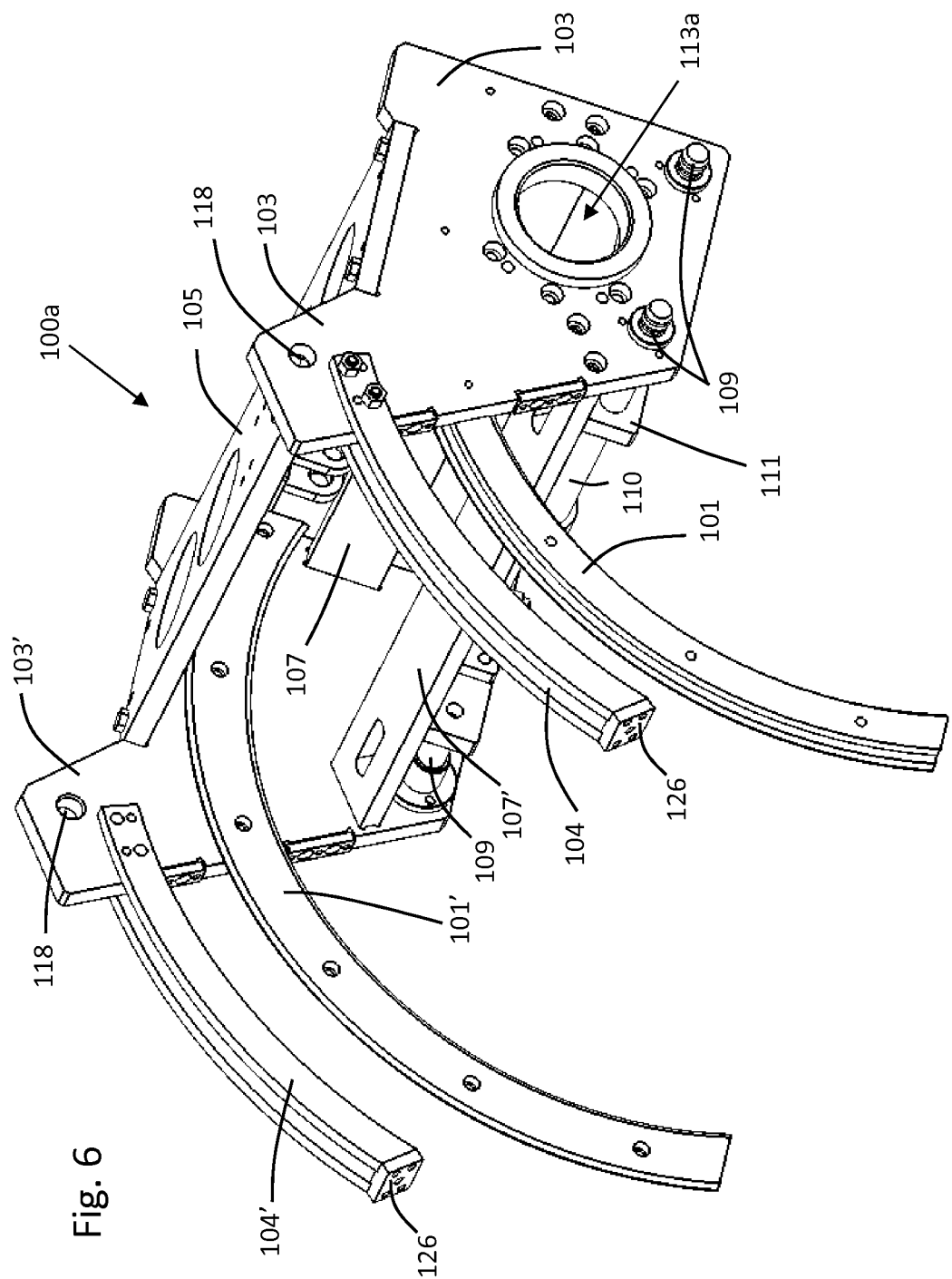
FIGS. 6-8 show the two sliding portions and a fixing assembly of the tightener group of FIGS. 3-5.

FIG. 6 shows the first sliding portion 100a. This sliding portion comprises guides 101, 101' connected to the middle part of the surfaces of the first standing plates 103, 103' facing one another. In the present embodiment, the guides 101, 101' are arc-shaped to define a curvilinear path for the movement of the automated tightener 100 over the cylindrical watertight case 11.

The diameter of the arc of the guides 101, 101' can be selected in view of the diameter of the watertight case 11.

Trails 104, 104' are connected to the upper part of the first standing plates 103, 103', respectively. Trails 104,104' helps the standing plates 102, 102', 103, 103' to maintain their balance during the reciprocal movement of the sliding portions 100a, 100b.

Both the guides 101, 101' and trails 104, 104' have arc-shape form abutting, respectively, the second standing plates 102, 102' of the second sliding portion 100b.

Figure 7:
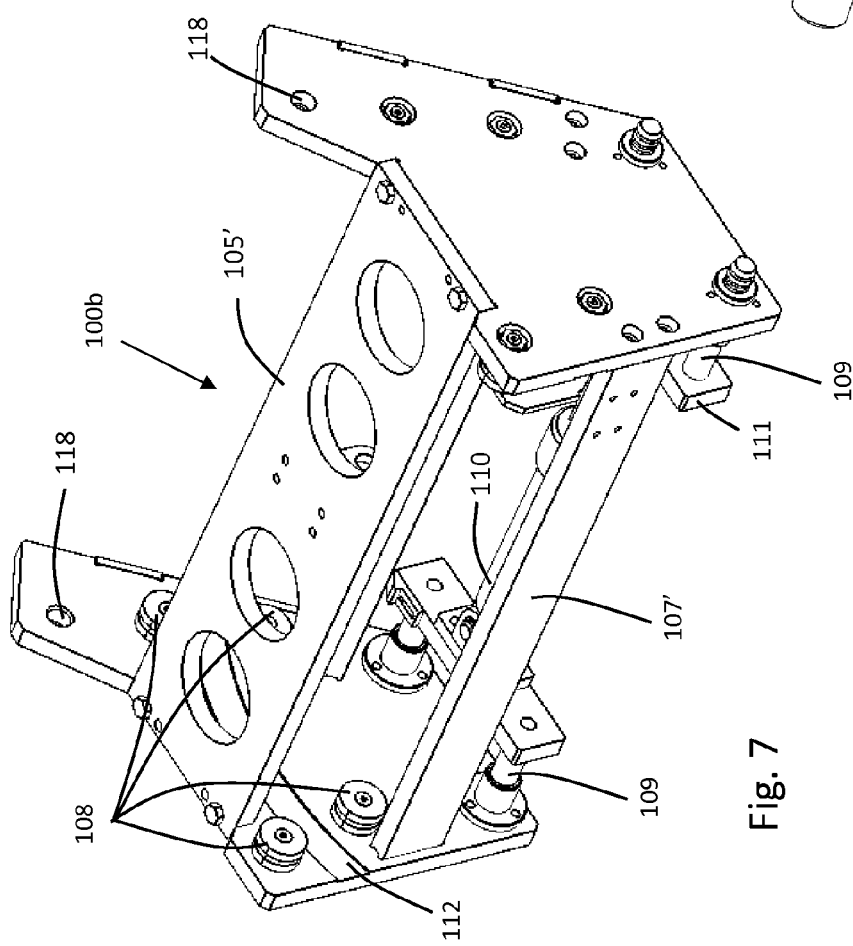

The guides 101, 101' interact with notched rollers 108 provided in couples—at least two couple, four in the present embodiment—onto the surfaces of the second standing plates 120, 102' facing another other, as from FIG. 7, showing the second sliding portion 100b. The notched rollers 108 of each standing plates 102, 102' are disposed aside a groove 112 having a shape complementary to that of the guide 101, 101'.

Advantageously the guides 101, 101' has a V-shaped cross-section and the grooves 112 are formed so to tongue together.

Trails 104, 104' comprise two arms each, fastened to both the surfaces of the first standing plates 103, 103', respectively. At the end opposed to the plate-fastened one, the two arms are joined by a small block 119. The upper portion of each second standing plate 120, 102' is embraced by the arms of a trail 104, 104' and restrained therein by the small block 119, as it will be detailed in the following.

The first sliding portion 100a is provided with a fixing assembly which, in the depicted case, is a screw-driver assembly 113 inserted in a port 113a (see FIG. 6) to face the annular flange 25 of the first case 11.

Figure 8:
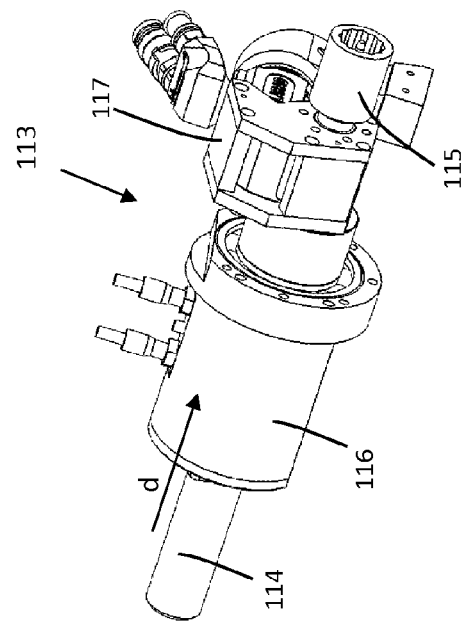

As detailed in FIG. 8, the screw-driver assembly 113 comprises a single-end-rod cylinder 114 connected to a screw-driver tool or screwing head 115 at the end facing the annular flange 25, and moving through a bearing box 116 which keeps the cylinder 114 substantially parallel to the parallel lay of the first and second sliding portions 100a, 100b and to the axis B of the case 11. A torque tool holder 117 is provided and connected to a hydraulic feed line imparting the pressure to reach the desired torque. For example, the torque tool holder 117 holds a Plarad hydraulic torque tool (marketed by Maschinenfabrik Wagner GmbH & Co).

In order to relatively move the first and second sliding portions 100a, 100b, the automated tightener 100 is provided with a push/pull actuator 106 having the ends connected to the spacing plates 105, 105'.

Preferably the push/pull actuator 106, 106' is a piston assembly arranged orthogonally to the sliding portions 100a, 100b parallel lay.

A plurality of position sensors are provided for stopping the movements of the automated tightener portions. The automated tightener 100 of the present embodiment is movable step by step around the cylindrical body of the first case 11 in order to secure this case to the second case 12. As already said above, fixing and tightening together cases 11, 12 by their respective first and second coupling ends 13, 14 is a necessary step before carrying out the opening gate 18, 19 and establishing the sought electrical, mechanical and, optionally, optical connection between first and second phase connectors 16, 17. In particular, once the alignment and coupling between cases 11 and 12 has been obtained, the cases 11, 12 are fixed to each other, for example by bolts, as hereinafter described.

The automated tightener 100 can be positioned over the first case 11 before or after the alignment and coupling with the second case 12. In the first instance, the automated tightener 100 can associated to the first case 11 before it is submerged. This association can be attained by the operable engagers 109 of both the first and the second sliding portions 100a and 100b inserted into the relevant mating holes 32 of the front and rear sub-flanges 28, 29 according to the movement depicted by arrows c, c'.

When the automated tightener 100 is be associated to the first case 11 after the alignment and coupling with the second case 12, a scaffolding 120 (see FIGS. 9-11) can be used for submerging the automated tightener 100 and placing it upon the first case 11.

In a preferred deployment procedure, the automated tightener 100 is submerged associated to the first case 11 by the scaffolding 120. In this case the automated tightener 100 is connected to the scaffolding 120 (in a manner explained hereinbelow) and it is not engaged to the watertight case 11 via the operable engagers 109.

The scaffolding 120 is then used to recover the automated tightener 100 at the end of the case fastening procedure.

Figure 9:
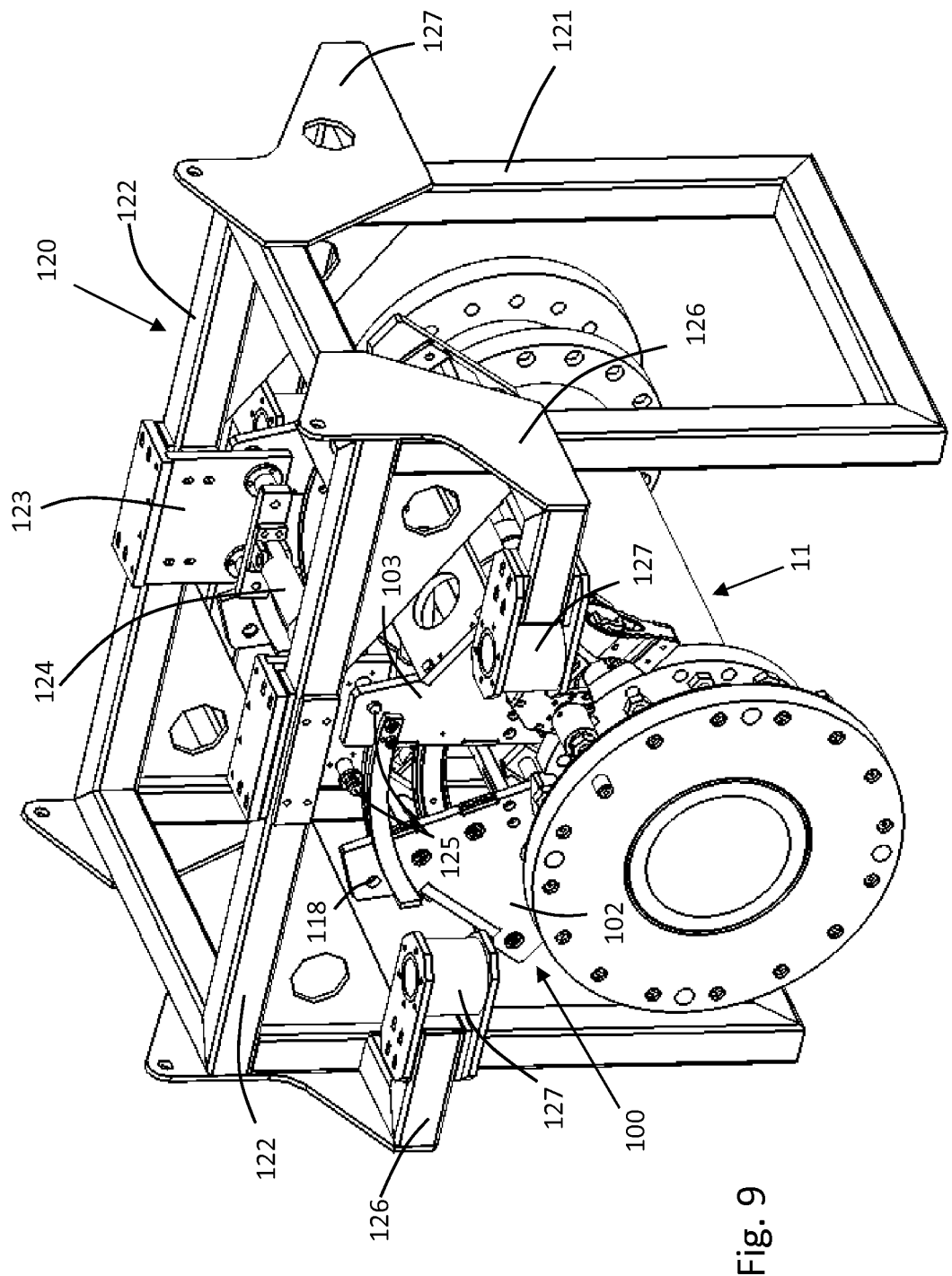
FIGS. 9-11 show an example of scaffolding for transporting an automated tightener according to the invention.
Figure 10:
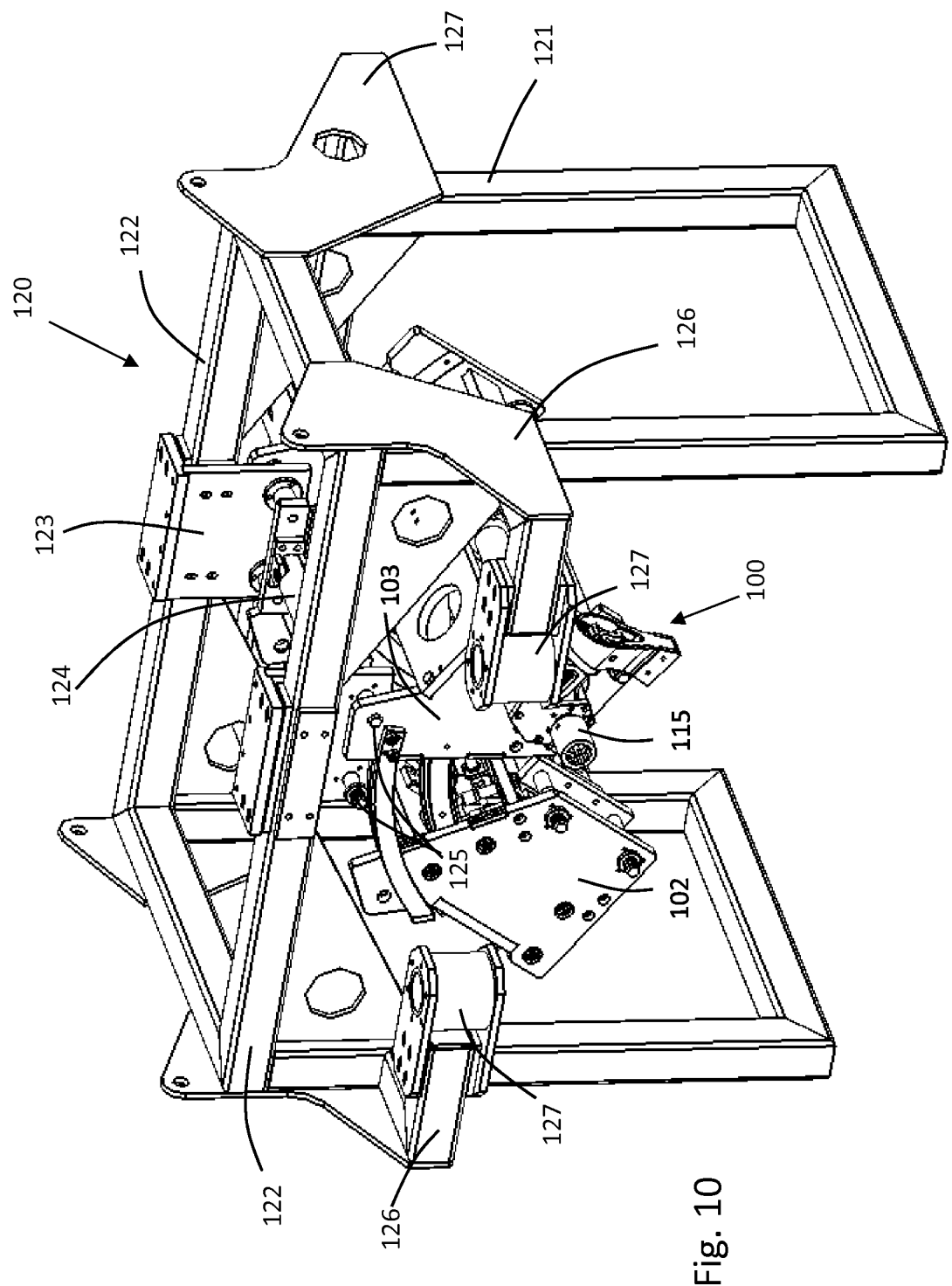
Figure 11:
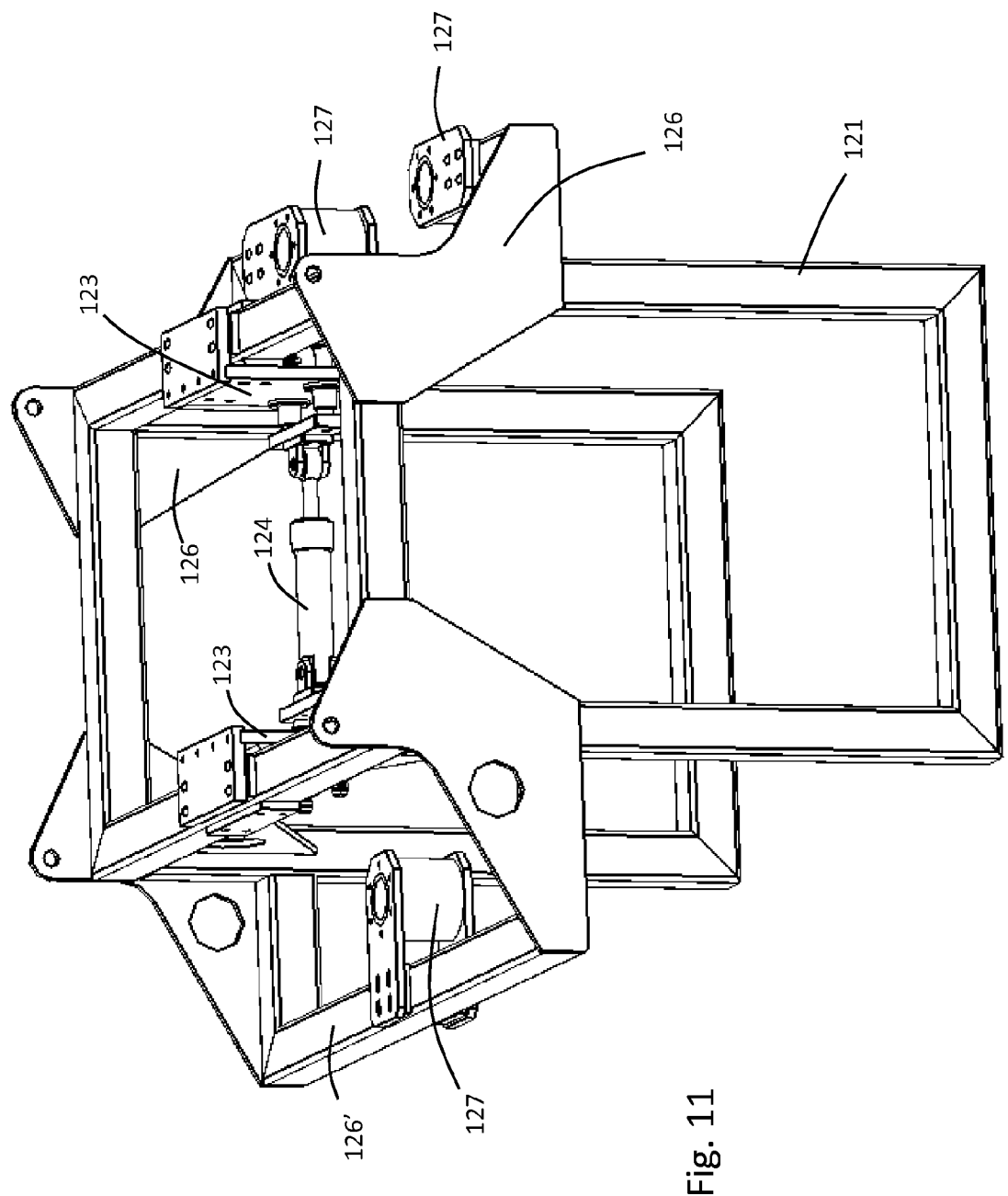

As from FIGS. 9-11, the scaffolding 120 comprises standards 121 and ledgers 122. A porting flange 123 hangs from substantially the middle of each ledger 122. The porting flanges 123 are crossed hanging rods 125 (two per flange, in the present embodiment) connected to a grasping actuator 124. The hanging rods 125 have heads designed for inserting into holes 118 provided in the upper portion of the first and second standing plate 102, 102', 103, 103' of the automated tightener 100. In FIG. 9, the first and second sliding portions 100a, 100b are shown as spaced, but in the step of submerging/recovering the automated tightener 100, these portions should be close for interacting with the hanging rods 125.

The grasping actuator 124 operates substantially the same movement already illustrated above for the engaging actuators 110.

The scaffolding 120 comprises arms 126 attached to ledgers 122 and standards 121 and bearing a bonding ring 127 each. In the depicted embodiment, as from FIG. 11, the scaffolding 120 comprises two front arms 126 in the portion of designed to face the annular flange 25 of the watertight case 11, and a single U-shaped arm 126' in the opposite portion, bearing a bonding ring 127 at substantially the middle thereof.

Figure 5:
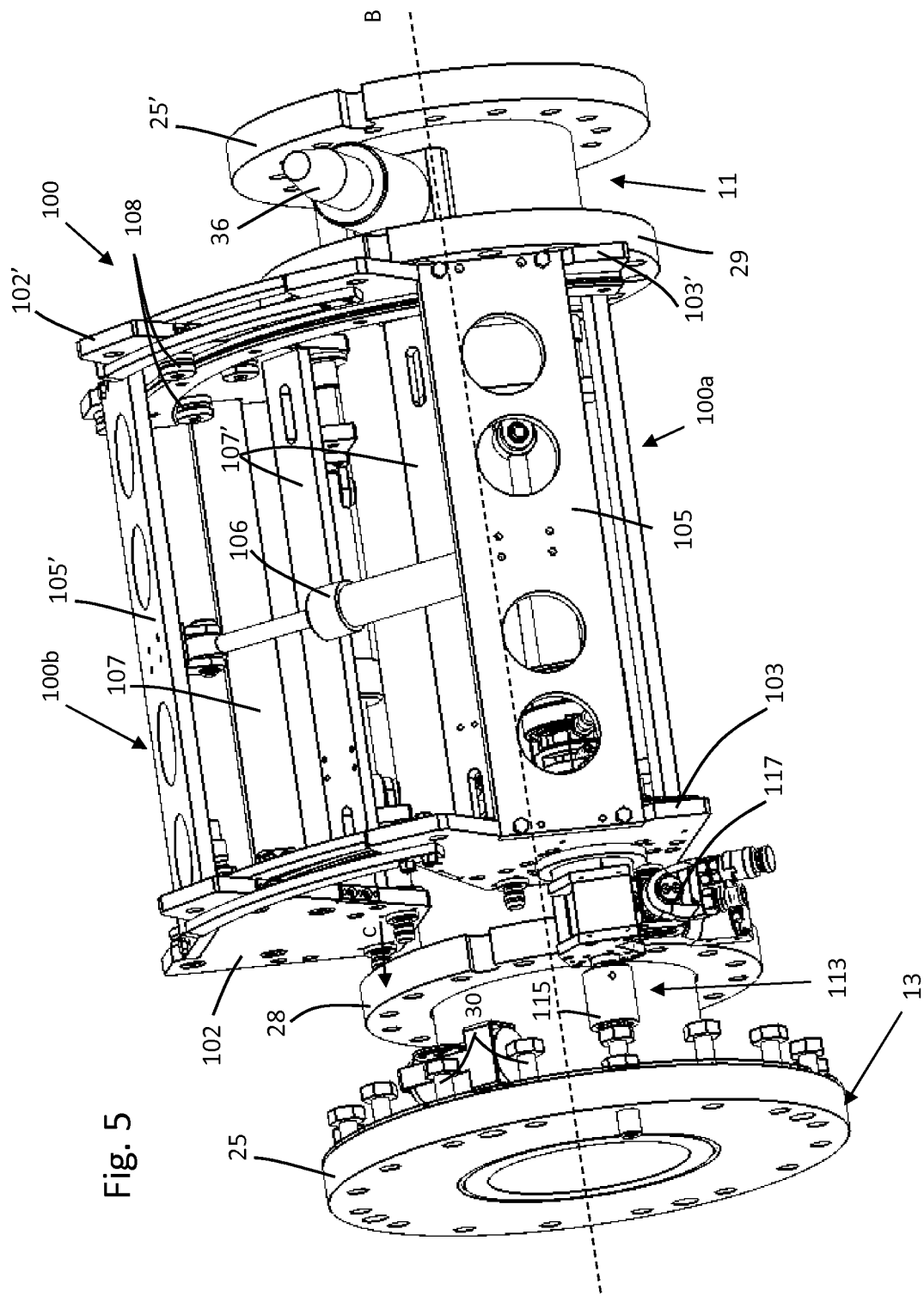

Each bonding ring 127 is designed for firmly coupling to a conical element 36 of the watertight case 11 as illustrated in FIG. 5. In particular, the bonding ring 127 of the U-shaped arm 126' is positioned to couple with the conical element 36 of FIG. 5, while the rings 127 of the front arms 126 couple with respective conical element provided at the lateral end of a plate fixed onto the annular flange 25 (not illustrated). The connection between bonding ring 127 and respective conical element 36 makes the scaffolding 120 and the watertight case 11 linked one another.

As from FIG. 9, when the scaffolding 120 and the watertight case 11 are conjoined, the automated tightener 100, clasped to the porting flanges 123 of the scaffolding 120, is as "sandwiched" between scaffolding 120 and watertight case 11, so it can be submerged without further connection to the watertight case 11.

At the beginning of the procedure of fastening the first and second watertight cases 11, 12 one another, the engaging actuators 110 of the automated tightener 100 push the operable engagers 109 into the mating holes 32 of the watertight case 11 to engage at least the first sliding portions 100a to the case 11. The grasping actuator 124 of the scaffolding 120 retracts the hanging rods 125 from the holes 118 provided in the upper portion of the first and second standing plate 102, 102', 103, 103' of the automated tightener 100, so to get them free to move about the surface of the watertight case 11.

The single-end-rod cylinder 114 of the screw-driver assembly 113 advances the screw-driver tool 115 (as from arrow d in FIG. 8) to engage with a bolt 30 loosely positioned into the annular flange 25 of the case 11.

The holes in the annular flange 25 where the bolts 30 are positioned are not threaded. Between the surface of the annular flange 25 and the head of each bolt 30, a metal ring with two thread leads for keeping the bolt in place is arranged.

Once the engaged bolt 30 is tighten, the shaft 114 retracts the tool 115, and the first and second sliding portions 100a, 100b move for positioning the screw-drive assembly 113 in front of the next bolt 30 to be tighten.

In particular, the engagers 109 of the second sliding portion 100b are retracted—by their engaging actuator 110—from the mating holes 32 of the front and rear sub-flanges 28, 29, according to a movement opposite to arrows c, and the push/pull actuator 106 pushes the second sliding portion 100b away from the first sliding portions 100a. During this pushing step, the moving path of the second sliding portion 100b is directed by the guides 101, 101' sliding in the grooves 112, and helped by the trails 104, 104'. The movement of the second sliding portion 100b is stopped by induction sensors suitably positioned onto the elongated element 107' of this sliding portion.

Once the second sliding portion 100b reached the new position, the operable engagers 109 thereof are inserted into the mating holes 32 of the front and rear sub-flanges 28, 29, according to a movement as from arrows c and pushed by the engaging actuator 110.

When the second sliding portion 100b is engaged again to the first case 11, the operable engagers 109 of the first sliding portion 100a are retracted—by their engaging actuator 110—from the mating holes 32 of the front and rear sub-flanges 28, 29, according to a movement opposite to arrows c', and the push/pull actuator 106 pulls the first sliding portion 100a toward the second sliding portions 100b. Then the operable engagers 109 of the first sliding portion 100a are inserted again into the mating holes 32 of the front and rear sub-flanges 28, 29, according to a movement as from arrows c', for engaging the first sliding portion 100a to the watertight case 11.

By repeating the above-mentioned step, the automated tightener 100 according to the invention provides for tightening all of the bolts 30 by turning around the first case 11.

The tightening procedure can be remotely monitored by one or more cameras suitably positioned, for example connected to the first sliding portion 100a, and operated by a low voltage power feed line which can be the same mentioned above.

The invention claimed is:

1. An automated tightener for a wet mateable connection assembly comprising a first and a second watertight case, the automated tightener bearing a fixing assembly and comprising a first and a second sliding portions arranged in a parallel lay, connected together by a push/pull actuator substantially orthogonal thereto, each sliding portion being provided with operable engagers,
   wherein each sliding portion comprises two standing plates substantially orthogonal to the parallel lay of the sliding portion and spaced by a spacing plate.

2. The automated tightener according to claim 1, wherein the push/pull actuator is connected to the spacing plates of the sliding portions.

3. The automated tightener according to claim 1, comprising guides for leading the reciprocal movement of the two sliding portions.

4. The automated tightener according to claim 3, wherein the guides are fixed onto said standing plates of one of the sliding portions and engaged with retaining elements of an other sliding portion.

5. The automated tightener according to claim 3, wherein the guides are arc shaped.

6. The automated tightener according to claim 1, wherein the operable engagers are provided across the standing plates of each sliding portion.

7. The automated tightener according to claim 1, wherein the operable engagers are movable in opposite directions, substantially parallel to spacing plates.

8. The automated tightener according to claim 1, wherein the operable engagers of a sliding portion are operated jointly by a single engaging actuator.

9. The automated tightener according to claim 1, wherein the fixing assembly comprises a power screw-driver tool for connecting the watertight cases by bolts.

10. The automated tightener according to claim 1, wherein the automated tightener is remotely operated.

11. A method for underwater fastening a first watertight case to a second watertight case of a wet mateable connection assembly by an automated tightener, wherein the first watertight case is provided with an array of spaced coupling means; and the automated tightener bears a fixing assembly and comprises a first and a second sliding portion; comprising the steps of:
   associating the automated tightener with the first watertight case;
   engaging the first sliding portion to the first watertight case;
   locking a coupling means of the array to the second watertight case by operating the fixing assembly;
   distancing the second sliding portion from the first sliding portion;
   engaging the second sliding portion to the first watertight case;
   disengaging the first sliding portion from the first watertight case;
   approaching the first sliding portion to the second sliding portion; and
   repeating the steps up to a completion of tightening of the first watertight case to the second watertight case.

12. The method according to claim 11, wherein engaging the first and the second sliding portions to the first watertight case comprises engaging an operable engager of the automated tightener with a coupling portion of the first watertight case.

13. The method according to claim 12, wherein the coupling portion of the first watertight case is a flange.

14. The method according to claim 11 wherein the array of spaced coupling means is arranged on a flange of the first watertight case.

15. The method according to claim 11, wherein engaging the first sliding portion or the second sliding portion to the first watertight case comprises engaging two operable engagers with two axially spaced coupling portions arranged on the first watertight case.

16. The method according to claim 11, further comprising removing the automated tightener from the wet mateable connection assembly after tightening completion.

17. The method according to claim 16, comprising connecting a scaffolding to the automated tightener, disengaging both the first sliding portion and the second sliding portion from the first watertight case and hauling the scaffolding together with the automated tightener connected thereto.

18. The method according to claim 11, wherein associating the automated tightener with the first watertight case comprises firmly attaching a scaffolding to the first watertight case while keeping the first sliding portion and the second sliding portion disengaged from the first watertight case and keeping the automated tightener connected to the scaffolding, sinking the scaffolding and the first watertight case connected thereto.

19. The method according to clam 18, wherein associating the automated tightener with the first watertight case comprises sinking the scaffolding and the automated tightener connected thereto and positioning the scaffolding over the first watertight case.

\* \* \* \* \*